Dec. 23, 1958 H. KRONHAUS 2,865,646
FOLDAWAY TEA CART
Filed June 11, 1957 3 Sheets-Sheet 1
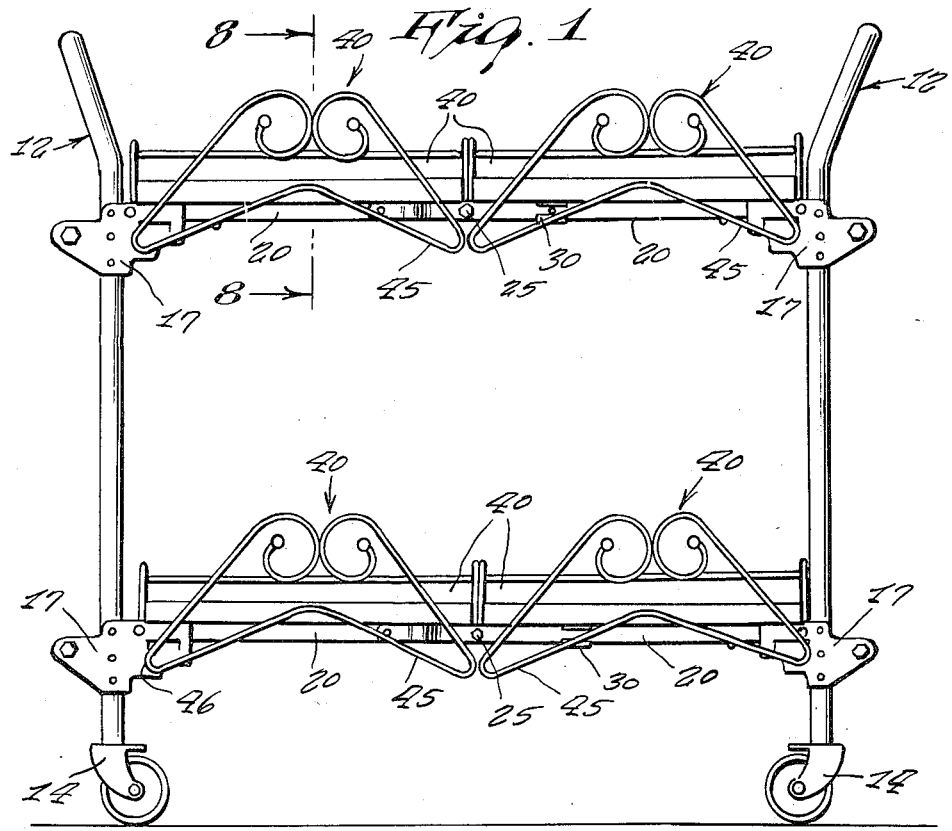
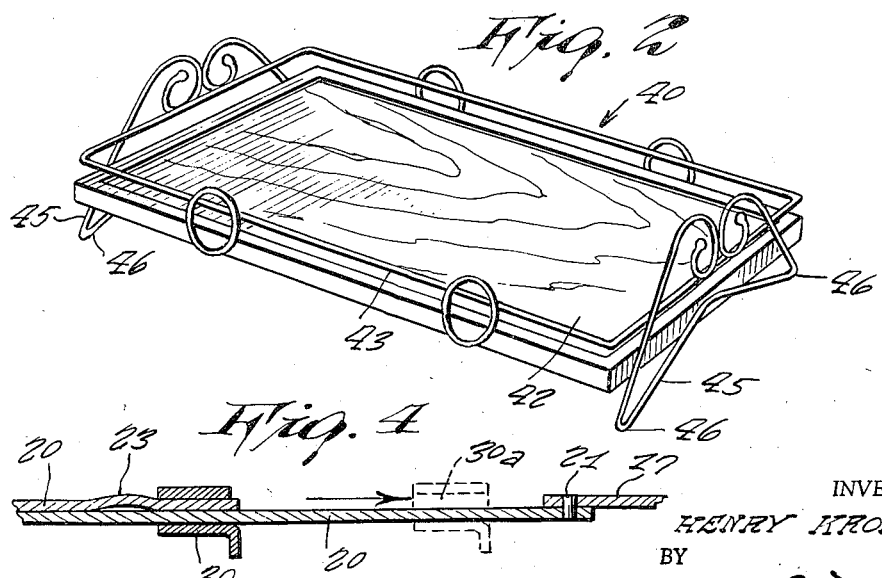
INVENTOR.
HENRY KRONHAUS
BY
Carl Miller
ATTORNEY.

INVENTOR.
HENRY KRONHAUS
BY
Carl Miller
ATTORNEY

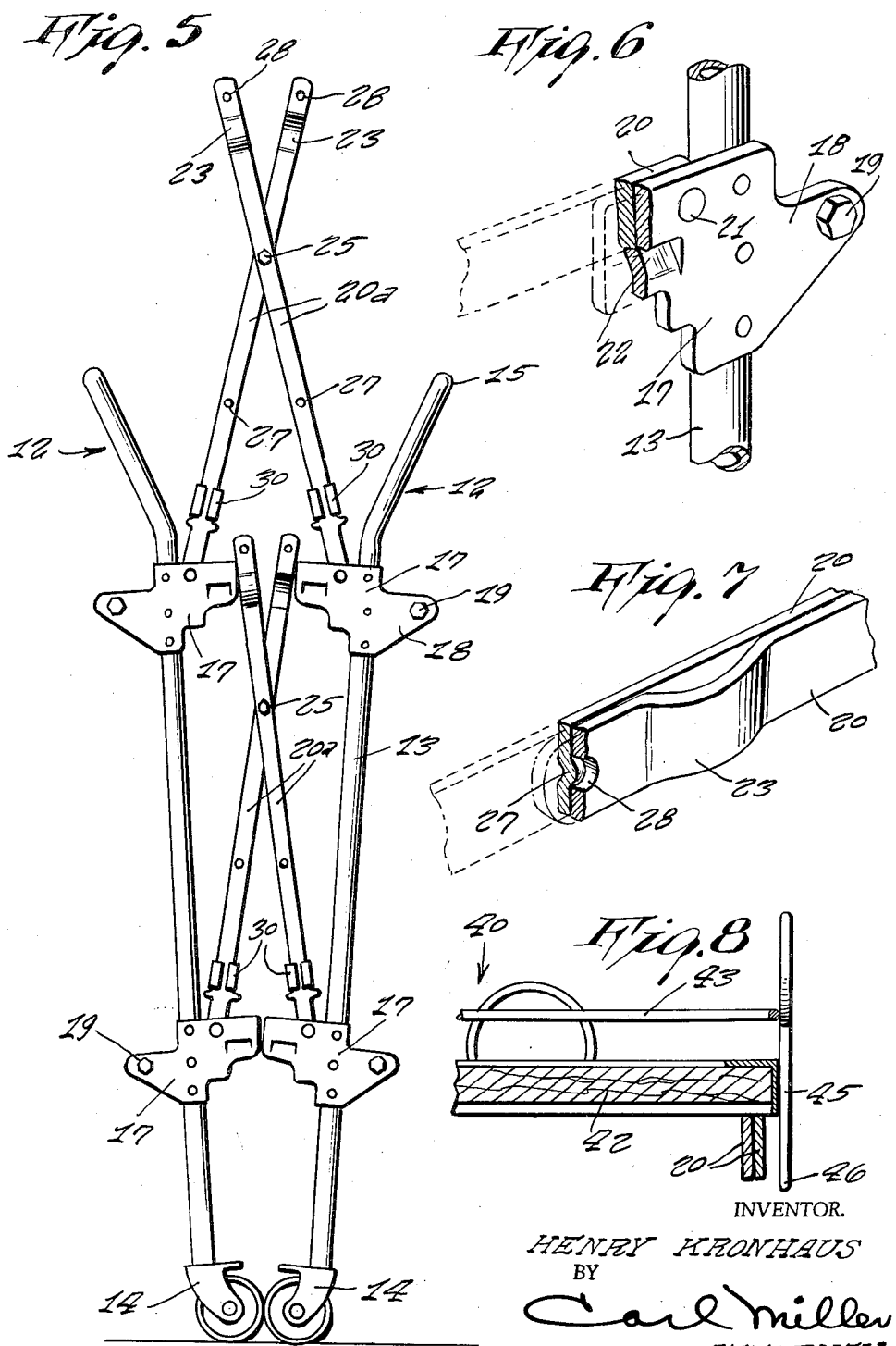

United States Patent Office 2,865,646
Patented Dec. 23, 1958

2,865,646

FOLDAWAY TEA CART

Henry Kronhaus, Brooklyn, N. Y.

Application June 11, 1957, Serial No. 664,960

2 Claims. (Cl. 280—41)

This invention relates to home furnishings and, more particularly, to a foldway tea cart having a plurality of removable serving trays associated therewith.

While tea carts are usually quite desirable in most homes as they are convenient for many purposes, they are also quite bulky and require a substantial amount of floor space even when not in use. Accordingly, it is an object of the present invention to provide a tea cart that may be conveniently used in a conventional manner when desired, and which can also be readily and efficiently folded to a storage position in which it requires a minimum amount of floor and storage space when not in use.

Another object of the present invention is to provide a foldway tea cart having a plurality of serving trays that may be used independently or in conjunction with the tea cart so as to provide a maximum of convenience and utility with a minimum amount of wasted storage space.

Still another object of the present invention is to provide a convenient tea cart that is simple in construction, efficient in use, and which will overcome all of the aforementioned storage and transportation problems, and which can be manufactured in large quantities at relatively low cost.

All of the foregoing and still further objects and advantages of this invention will become apparent from a study of the following specification, taken in connection with the accompanying drawing, wherein:

Figure 1 is a side elevational view of a folding tea cart made in accordance with the present invention, in operative use;

Figure 2 is an enlarged perspective view of a serving tray forming a part of the present invention;

Figure 4 is an enlarged longitudinal across sectional view taken along line 4—4 of Figure 3;

Figure 5 is a side elevational view showing the cart in a completely folded position;

Figure 6 is a fragmentary perspective view taken along line 6—6 of Figure 3;

Figure 7 is an enlarged cross sectional view taken along line 7—7 of Figure 3; and Figure 8 is a fragmentary transverse cross sectional view taken along line 8—8 of Figure 1.

Figure 3:
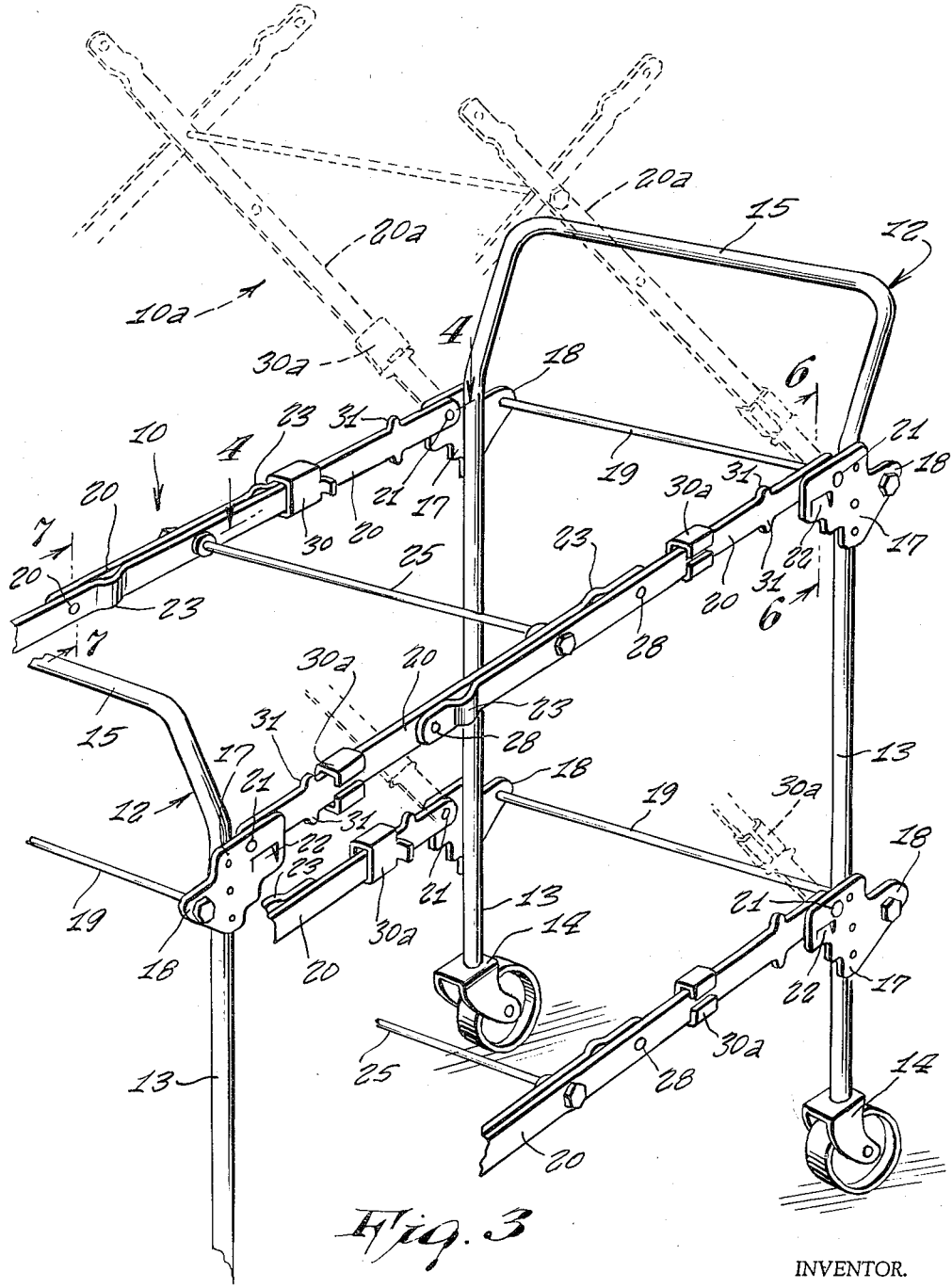
Figure 3 is a fragmentary perspective view, with the trays removed, showing the manner in which the tea cart may be folded to a storage position.

Referring now to the drawing and more particularly to Figures 1 and 3 thereof, a tea cart 10 made in accordance with the present invention is shown to include a pair of inverted U-shaped end frames 12 that include spaced parallel legs 13 having casters 14 at the free ends thereof and a transversely extending member forming a handle 15. Two sets of brackets 17 are supported in vertically spaced relationship upon the legs 13, each set including a pair of brackets 17, one such bracket of each pair being supported upon a different one of the legs 13.

As is more clearly shown in Figure 6, each bracket 17 is identical to the others and is provided with a rearwardly disposed extension 18 which supports one end of a transversely extending rod 19 that connects both brackets in each pair. The opposite side of the bracket is provided with a transversely extending pivot pin 21 which rotatably supports a lever arm 20. A struck out portion 22 in each bracket forms a limit stop and support member for the associated arm 20 so as to limit the downward movement of the arms beyond a horizontal position. However, the arms 20 are rotatable in an opposite direction, as shown in Figure 5. A transversely extending and rotatable pivot rod 25 connects the mid portions of all of the arms 20 associated with each complete set of brackets 17. Thus, a single pivot rod 25, as clearly shown in Figure 3, connects the mid portions of the upper arms 20, while an identical pivot rod 25 connects the mid portions of the lower arms 20. The mid portion of each arm 20, intermediate the pivot rod 25 and pivot pin 21, is provided with a dimple 27, as shown in Figure 7, that is adapted to be received within a bore 28 as the outermost extremity of the associated arm. With the cart 10 in a completely assembled position, as shown in Figure 3, the dimples 27 releasably prevent the relative rotation of each associated pair of arms so that the arms are snapped out of their parallel relationship toward the folded position 20a when desired.

A pair of keepers 30 are also slidably associated with each pair of arms 20 so that they may be selectively moved into and out of overlapping engagement with the free end of each of the arms and the mid portion of the associated arm. These keepers are used to prevent the accidental rotation of the associated arms out of their normally parallel relationship. A bulbous portion 23 at each end of the arms 20 limits movement of the keeper in one direction, while stops 31 adjacent to the opposite end of each arm limits movement in an opposite direction.

Referring again to Figure 3 of the drawing, it will be noted that the cart is normally arranged for use with all of the arms 20 in substantially spaced parallel alignment with each other. With the keepers 30 in an operative position, they overlie the dimple 27 and associated bore 28 of each pair of arms so as to maintain them in proper position and against relative rotation. However, by sliding the keepers 30 to an inoperative position 30a, the arms are free to rotate relative to each other to the inclined position 20a so that the cart will assume the completely folded positions 10a, as shown in Figure 5. In this position, a minimum amount of floor space is required for the device so that it may be readily stored, packed, or stacked for shipment. It is only necessary to reverse the aforementioned procedure to immediately arrange the cart for use.

Referring now to Figures 1, 2, and 8, two pairs of trays 40 are shown in operative use upon the cart 10, one pair on each set of arms. Each of these trays 40 is shown to include a substantially flat base 42 having an upwardly extending guard railing 43 for positioning substantially any type of food or serving item therewithin. The longitudinal ends of each tray 40 are provided with decorative stop elements 45 having support feet 46 at their lowermost extremities. With reference to Figure 1, it will be noted that these decorative stop elements 45 centrally position the trays upon the associated support arms 20 so that they are not movable transversely of the cart, thereby preventing the accidental falling thereof. Any one or several of these trays may be removed from the cart, as desired, for serving purposes, whereupon they may be supported on any flat surface upon the attractive depending feet 46. Of course, these trays may be used completely independently of the tea cart whenever desired, especially when the cart is in the storage poistion.

While this invention has been described with particular reference to the construction shown in the drawing, it is to be understood that such is not to be construed as imparting limitations upon the invention, which is best defined by the claims appended hereto.

Having thus described my invention, I claim as new and desire to secure by Letters Patent:

1. A folding tea cart frame including the combination of a pair of end members, each of which comprises a pair of normally upright parallel legs spaced apart, a transverse elongated member rigidly interconnecting the upper portions of the two legs in each pair, a pair of similar links pivotally connected at one end of each individually to the legs in each pair a predetermined distance below the upper ends thereof with each link in each pair pivotally connected at an intermediate position to a corresponding intermediate portion of the corresponding opposite link in each pair, so that in erected position of the frame the other ends of the links overlap each other with their intermediate portions of the links to which they are connected, a transverse rod extending from one connected pair of links to the other pair and forming at the ends of said rod the pivots by which the two pairs of links are pivotally connected, a second pair of mutually similar links pivotally connected at one end of each individually to said legs in each pair of the latter a predetermined distance above the lower ends thereof with each link in each second pair pivotally connected at an intermediate portion to a corresponding intermediate portion of the corresponding opposite link in each second pair, so that in erected position of said frame, the other ends of the links of said second pairs overlap intermediate portions of the links to which they are pivotally connected, a second transverse rod extending from the intermediate portions of one of the second pair of links to the intermediate portions of the other pair of the latter links and forming the pivots at the ends thereof by which the second pairs of links are pivotally connected, and a locking member slidably mounted upon each link between the pivoted end and intermediate portion thereof in effective position to be longitudinally shifted along the same to engage upon and lock the overlapping end of the respectively opposite link thereto which is connected to the link involved, at a point remote from the transverse rod forming the pivot of the two links thus locked by the locking member in each case.

2. A folding tea cart frame according to claim 1, wherein the overlapping end of each link beyond the transverse rod has a stop thereon to limit the engagement of the locking member upon the overlapping end and prevent said locking member from approaching closely to the pivot interconnecting the links formed by said transverse rod, and wherein each leg of the end members has two plates secured thereto in vertically spaced apart relation and forming pivot mountings for the pivoted ends of the links upon said legs, and the plates have end projections beyond said legs with an outer transverse tie rod interconnecting the end projections upon each pair of legs a predetermined distance below the transverse elongated member upon the legs, with a stop disposed upon each plate, has a stop for preventing the link pivotally connected thereto from being swung down below a horizontal position to determine the erected position of said frame as a whole.

References Cited in the file of this patent

UNITED STATES PATENTS

| | | |
|---|---|---|
| 638,100 | Courtney | Nov. 28, 1899 |
| 724,492 | Palmer | Apr. 7, 1903 |
| 995,114 | Clark et al. | June 13, 1911 |
| 2,001,438 | Stuck | May 14, 1935 |
| 2,020,766 | Brown | Nov. 12, 1935 |
| 2,154,800 | Zumwinkel | Apr. 18, 1939 |
| 2,212,053 | Smith | Aug. 20, 1940 |
| 2,354,941 | Treitel | Aug. 1, 1944 |
| 2,393,149 | Cunningham | Jan. 15, 1946 |
| 2,398,863 | Sides | Apr. 23, 1946 |
| 2,429,034 | Smith et al. | Oct. 14, 1947 |
| 2,679,736 | Duchin | June 1, 1954 |
| 2,720,402 | De Puy et al. | Oct. 11, 1955 |

FOREIGN PATENTS

| | | |
|---|---|---|
| 21,055 | Great Britain | of 1910 |